US012752853B2

(12) United States Patent
Sabino Urbieta et al.

(10) Patent No.: US 12,752,853 B2
(45) Date of Patent: Oct. 6, 2026

(54) ROCKER ASSEMBLY FOR A VEHICLE

(71) Applicant: AUTOTECH ENGINEERING S.L., Amorebieta-Etxano (ES)

(72) Inventors: Alexander Rafael Sabino Urbieta, Sopela (ES); Diego Argote Quintana, Vitoria-Gasteiz (ES); Iker Bollegi Zuloaga, Abadiño (ES)

(73) Assignee: AUTOTECH ENGINEERING S.L., Amorebieta-Etxano (ES)

( * ) Notice: Subject to any disclaimer, the term of this patent is extended or adjusted under 35 U.S.C. 154(b) by 288 days.

(21) Appl. No.: 18/694,634

(22) PCT Filed: Sep. 28, 2022

(86) PCT No.: PCT/EP2022/076911

§ 371 (c)(1),
(2) Date: Mar. 22, 2024

(87) PCT Pub. No.: WO2023/052388

PCT Pub. Date: Apr. 6, 2023

(65) Prior Publication Data

US 2025/0121887 A1 Apr. 17, 2025

(30) Foreign Application Priority Data

Sep. 29, 2021 (EP) .................................... 21382878

(51) Int. Cl.
*B62D 25/02* (2006.01)
*B60K 1/04* (2019.01)
(Continued)

(52) U.S. Cl.
CPC .............. *B62D 21/157* (2013.01); *B60K 1/04* (2013.01); *B62D 25/025* (2013.01); (Continued)

(58) Field of Classification Search
CPC ................................ B62D 25/025; B60K 1/04
See application file for complete search history.

(56) References Cited

U.S. PATENT DOCUMENTS

2018/0057060 A1 3/2018 Tyan et al.
2021/0146766 A1 5/2021 Haberl et al.
(Continued)

FOREIGN PATENT DOCUMENTS

CN 211223635 U * 8/2020
DE 102012024836 A1 6/2014
(Continued)

OTHER PUBLICATIONS

Machine translation of Jaschke et al. (DE 102019201415) published Aug. 6, 2020. (Year: 2020).*
(Continued)

*Primary Examiner* — Daniel J Colilla
(74) *Attorney, Agent, or Firm* — Squire Patton Boggs (US) LLP

(57) ABSTRACT

The present disclosure relates to a rocker assembly (10) for a vehicle comprising a rocker (20) and a rocker reinforcement (30) inside the rocker. The present disclosure further relates to a method (100) for manufacturing a rocker assembly for a vehicle. A rocker assembly (10) for a vehicle comprises a rocker (20) including an outer panel (11) and an inner panel (12), and an elongated reinforcement (30) inside the rocker extending along a longitudinal direction (40) of the rocker. The reinforcement (30) is made of a lattice of cells (31) and comprises a central group of cells (33) which are substantially hexagonal in cross-section. A cell is formed by a plurality of walls forming a closed cross-section. The central group of cells (33) comprises a central cell (50) surrounded by six adjacent cells (51).

19 Claims, 4 Drawing Sheets

(51) Int. Cl.
*B62D 21/15* (2006.01)
*B62D 29/00* (2006.01)
*B60R 16/04* (2006.01)

(52) U.S. Cl.
CPC ......... *B62D 29/007* (2013.01); *B62D 29/008* (2013.01); *B60R 16/04* (2013.01)

(56) References Cited

U.S. PATENT DOCUMENTS

| | | | | |
|---|---|---|---|---|
| 2023/0234644 | A1* | 7/2023 | Limousin ............. | B62D 21/157 296/187.12 |
| 2024/0123811 | A1* | 4/2024 | Yi ..................... | H01M 10/6556 |

FOREIGN PATENT DOCUMENTS

| | | | |
|---|---|---|---|
| DE | 102019201415 | A1 | 8/2020 |
| DE | 102021000251 | A1 | 3/2021 |
| WO | WO 2015/014620 | A2 | 2/2015 |

OTHER PUBLICATIONS

Machine translation of Dollmann et al. (DE 102021000251) published Mar. 18, 2021. (Year: 2021).*
International Search Report and Written Opinion mailed Nov. 10, 2022, for International Application No. PCT/EP2022/076911, 15 pages.

* cited by examiner

ROCKER ASSEMBLY FOR A VEHICLE

CROSS-REFERENCE

The present application is a National Stage filing under 35 U.S.C. § 371 of International Patent Application No. PCT/EP2022/076911, filed Sep. 28, 2022, which claims the benefit of and priority to European Patent Application No. EP21382878.3, filed Sep. 29, 2021, the contents of all of which are hereby incorporated by reference in their entireties for all purposes.

TECHNICAL FIELD

The present disclosure relates to a rocker assembly for a vehicle comprising a rocker and a rocker reinforcement inside the rocker. The present disclosure further relates to a method for manufacturing a rocker assembly for a vehicle.

BACKGROUND

Vehicles such as cars incorporate a structural skeleton designed to withstand all loads that the vehicle may be subjected to during its lifetime. The structural skeleton or "Body In White" (BIW) is further designed to withstand and absorb impacts, in case of e.g. collisions with other cars. The structural skeleton is also designed to be as lightweight as possible in order to reduce the emission of pollutants such as $CO_2$ to the environment or to reduce the consumption of electricity in an electric vehicle.

The structural skeleton or BIW of a car may for instance include bumpers, pillars (e.g. A-pillar, B-pillar, C-pillar), side impact beams and rocker panels. These and other structural members may have one or more regions with a substantially U-shaped (also known as "hat"-shaped) cross section. These structural members may be manufactured in a variety of ways and may be made of a variety of materials. For instance, rocker panels may be made of steel, particularly Ultra-High Strength Steels (UHSS) and may be manufactured through press hardening.

Ultra-High Strength Steels (UHSS) exhibit optimized maximum strength per weight unit and advantageous forming properties in the automotive industry, for the structural framework of the vehicle or at least a number of its components. In the present disclosure, an UHSS may be regarded as a steel with a maximum tensile strength (after hot stamping) of at least 1000 MPa, preferably up to about 1500 MPa or up to 2000 MPa or more. An example of an UHSS used in the automotive industry is 22MnB5 steel.

Processing a component for a vehicle may comprise forming of a metal plate, in particular a steel plate, in order to give the plate a desired shape. One process that is used particularly in the automotive industry is Hot Forming Die Quenching (HFDQ). In the HFDQ process, a steel blank is heated to above an austenization temperature, above Ac1 or above Ac3. After heating to above the austenization temperature, the blanks are placed in a hot forming press. The blanks are deformed and at the same time are quenched (rapidly cooled down). Cooling down may typically occur at a rate that is higher than a so-called critical cooling rate. The critical cooling rate for steels in HFDQ may be around 27° C./s. As a result of the quenching, the deformed blank may obtain a martensitic microstructure. Depending on the exact temperature and the heating time, a fully martensitic microstructure can be obtained. The resulting product in this manner can obtain a high hardness, and corresponding high ultimate tensile strength, and high yield strength. On the other hand, maximum elongation (elongation at break) may be relatively low.

Tailored heating or tailored in-die cooling may be used to provide so-called "soft zones", i.e. areas with higher ductility, and lower ultimate tensile strength and yield strength. The microstructure in these areas may not be fully martensitic due to selective heating (e.g. not all areas of a blank are heated to an austenization temperature) or due to tailored cooling (e.g. not all areas are cooled down with same cooling rate). They may comprise one or more of martensite, bainite, ferrite and perlite depending on the heat treatment they have been subjected to.

Besides tailored heating or cooling, also a partial heat treatment after HFDQ may be used. For example, an induction heater or a laser may be used to locally heat treat an area of the press hardened product. Heating time, maximum temperature and cooling rate may be adapted to obtain desired mechanical properties in terms of ductility, hardness, yield strength etc. and the corresponding microstructure.

A rocker lies along a side of the vehicle, below an opening for the door(s) and extends between a front wheel opening and a rear wheel opening. The rocker is sometimes referred to as "sill". A rocker generally includes two portions or panels which are joined to each other at corresponding flanges along the longitudinal direction of the rocker (and thus the longitudinal direction of the vehicle too), namely an inner rocker panel and an outer rocker panel. An inner rocker panel faces the vehicle interior whereas an outer rocker panel faces away from the vehicle. Rockers are important for absorbing sufficient energy while avoiding an excessive intrusion of the sides of a vehicle during a crash, especially in a lateral crash. The performance of a rocker, for instance in terms of energy absorption and intrusion, may be tested with e.g. a Euro NCAP's test.

Rockers are useful not only for protecting the passengers in a vehicle, but also for protecting the battery box in electrical (totally or partially electrical) vehicles. The battery box is generally arranged at a bottom of the vehicle, extending between the vehicle's front and rear axles. It is configured for supporting and housing the batteries of the vehicle. If the vehicle is involved in a collision, in particular against a lateral side of the vehicle, the rocker may avoid or at least reduce damage to the battery box. The rockers should be able to absorb as much energy as possible in order to maximize battery box protection.

A way to enhance energy absorption while providing an adequate level of deformation of a rocker may be adding a reinforcement to the rocker, e.g. between the inner rocker and the outer rocker panels. Optimizing the materials, geometry and means of attaching a rocker reinforcement to a rocker is important to improve the energy absorption and the integrity of the rocker during a lateral crash while keeping a lightweight piece.

The present disclosure aims to provide improvements in rocker reinforcements.

SUMMARY

Throughout this disclosure, a longitudinal direction, a vertical direction and a lateral direction are defined for providing spatial orientation of a rocker and a rocker reinforcement attached to the rocker. These directions are substantially perpendicular among each other. Thus, a rocker has a length along the longitudinal direction (the longitudinal direction would be parallel to a driving direction of the vehicle in which the rocker is mounted), a height along the vertical direction and a width along the lateral direction; and a cross-section of the rocker is defined by a plane substantially perpendicular to the longitudinal direction, thus including the vertical direction and the lateral direction. Likewise, a rocker reinforcement has a length along the longitudinal direction, a height along the vertical direction and a width along the lateral direction; and a cross-section of the rocker reinforcement is substantially perpendicular to the longitudinal direction and includes the vertical direction and the lateral direction.

Accordingly, when a rocker receives a side impact, e.g. during a vehicle crash when on the road, a side impact may be assumed to be substantially along a lateral direction in a standardized crash test. In practice, the impact may at least include a component substantially parallel to the lateral direction.

In a front crash, or SORB test ("Small Overlap Rigid Barrier"), the impact may be assumed to be substantially along a longitudinal direction in accordance with the above definitions. In the present disclosure, the focus will be primarily on side impacts.

In an aspect of the disclosure, a rocker assembly for a vehicle is provided. The rocker assembly comprises a rocker and an elongated reinforcement inside the rocker extending along a longitudinal direction of the rocker. A vertical direction and a lateral direction define a cross-section of the rocker assembly substantially perpendicular to the longitudinal direction. The rocker comprises an outer panel and an inner panel. The rocker reinforcement is made of a lattice of cells. A cell is formed by a plurality of walls forming a closed cross-section. The lattice of cells includes a central group of cells which are substantially hexagonal in cross-section. The central group of cells comprises a central cell surrounded by six adjacent cells.

According to this aspect, a honeycomb-like reinforcement may be provided inside a rocker. The reinforcement has a central group of substantially hexagonal cells in cross-section. The central group comprises a central cell surrounded by six adjacent cells, i.e. each wall of the central cell is a wall shared with a wall of an adjacent surrounding cell. Such a set of seven cells may be referred to as a tile throughout this disclosure. A central group of cells therefore comprises at least one tile, i.e. at least seven cells arranged as indicated herein. This configuration of the central group of cells may enhance the energy absorbed in a side impact while keeping a reasonable weight of the reinforcement.

Throughout this disclosure, a lattice of cells may be understood as a plurality of interconnected cells. Contiguous cells may share a wall between them. The walls of a cell may be substantially straight, although in some examples one or more cell walls may be curved. The cells form channels along a longitudinal direction of the reinforcement, and therefore of the rocker. The lattice of cells may be or at least may resemble a honeycomb lattice.

Throughout this disclosure it may be understood that a hexagonal cross-section of a cell may include a regular hexagon, i.e. the six walls of the hexagon have a substantially same length and the six central angles of the hexagon are about 120°, as well as an irregular hexagon. An irregular hexagon may be understood as a hexagon in which at least one of the following two conditions occur: not all the central angles are about 120°, and not all the walls have a same length.

In some examples, all the cells of the central group of cells may form, in cross-section, regular hexagons. Having regular hexagonal cells in cross-section may increase the energy absorbed by the rocker reinforcement, and therefore by the rocker assembly, during a side crash.

In some examples, the lattice of cells may further comprise a lateral group of cells. The lateral group of cells comprises an outer group of cells including one or more outer cells configured to receive an impact of the outer panel of the rocker, and an inner group of cells including one or more inner cells configured to transmit the impact to the inner panel of the rocker. In some of these examples, a portion of the cells configured to face the outer and inner rocker panels follows a shape of the outer and inner rocker panels.

As the outer and inner cells of the outer and inner group of cells, these groups being adjacent to the central group of cells, may have a shape adapted to the shape of the outer and inner rocker panels, the energy absorbed in a crash may be maximized while optimizing the space available inside the rocker. The walls of the cells of the inner and outer cells may also help to support the rocker during a side impact, thereby reducing rocker deformation and intrusion while still having a high absorption of energy. The cell walls following a portion of a rocker panel provide a surface for receiving an impact from the outer rocker panel and can help to provide stability in the deformation during a side crash.

In some examples, the rocker reinforcement may be arranged such that it is above a battery box of a vehicle when the rocker assembly is mounted to the vehicle. For example, the rocker reinforcement may be placed in a central or upper portion of the rocker. If a vehicle is involved in a crash which damages a rocker, the rocker reinforcement may absorb energy and, at the same time, guide or direct the loads above the battery box, therefore further protecting the battery box and the batteries. Intrusion of the rocker assembly in a battery box location may be avoided or at least reduced. Contact between the battery box and the rocker may also be avoided or at least reduced.

In some examples, two opposite walls of each cell of the central group of cells may be substantially parallel to the lateral direction in cross-section. The two opposite walls of a cell extending along the lateral direction may therefore be referred to as top wall and bottom wall of that cell. In other words, all the cells of the central group of cells may be oriented such that one diagonal of a corresponding hexagonal cell in cross-section, connecting two opposite vertices of the cell, is substantially parallel to the lateral direction. This orientation of the cells may also contribute to increase the energy absorbed by the rocker reinforcement.

In some examples, the lattice of cells may be organized in columns. The central group of cells may have a first column having at least two cells, a second column contiguous to the first column having at least three cells, and a third column contiguous to the second column having at least two cells. The first, second and third columns are contiguous along the lateral direction.

Throughout this disclosure, a column of cells may be understood as a set of adjacent cells, i.e. two or more cells, which are stacked along a vertical direction. Two opposite walls of a cell comprised in a column are substantially parallel to the lateral direction. Each cell in a column has a top wall and a bottom wall, in cross-section, extending along the lateral direction. Two cells stacked on top of each other in a column thus share a bottom/top wall (the top wall of one cell corresponds to the bottom wall of the other).

In some of these examples, the first column of the central group of cells may consist of two cells, the second column of the internal group of cells may consist of three cells, and the third column of the internal group of cells may consist of three cells. This specific configuration may achieve a high energy absorption while reducing the weight of the reinforcement. This may particularly apply if the central group of cells consists of these three columns, and therefore does not have further columns.

In some examples, the outer cells of the outer group of cells may form an outer column and the inner cells of the inner group of cells may form an inner column. I.e., the lateral group of cells comprises an outer column configured to receive an impact of the outer panel of the rocker having at least two outer cells, and an inner column configured to receive an impact of the inner panel of the rocker having at least two inner cells. A portion of the cells of the outer and inner columns facing the outer and inner rocker panels follows a shape of the outer and inner rocker panels.

In some examples, the reinforcement is an extruded profile. In other examples, a profile may be formed with roll-forming. Extrusion may be regarded as more suitable for profiles with a closed cross-section.

In some examples, the reinforcement is made of extruded aluminum. This reduces the weight of the rocker reinforcement. Herein, aluminum may cover aluminum and its alloys. Particularly aluminum 6XXX and 7XXX ("6000" and "7000" series) may be used.

In some examples, a thickness of the walls of the cells of the lattice of cells, e.g. the thickness of all the walls of the rocker reinforcement in cross section, may be between 1.5 and 5.5 mm, specifically between 2 and 4 mm, and more specifically about 3 mm. These dimensions, in particular for an extruded aluminum rocker reinforcement, may confer a sufficient strength to the reinforcement while maximizing energy absorption for a given weight.

In some examples, the inner panel and the outer panel of the rocker may be made of an ultra-high strength steel, specifically a press hardened ultra-high strength steel, e.g. a boron steel. A combination of lightweight aluminum for absorbing energy and UHSS for strength can lead to a good combination of energy absorption and impact resistance.

In a further aspect, a method for manufacturing a rocker assembly for a vehicle with a rocker reinforcement attached to the rocker as described herein is provided. The method comprises: providing a rocker including an inner rocker panel and an outer rocker panel; providing an aluminum rocker reinforcement with a cross-section according to any of the examples described throughout this disclosure; and mechanically attaching the rocker reinforcement to the rocker such that the cells of the central group of cells of the reinforcement are substantially hexagonal when taking a cross-section of the rocker assembly.

This method may enable enhancing energy absorption in a side crash. Passenger safety may therefore be increased.

In some examples, the reinforcement may be attached such that two opposite cell walls of each cell of the central group of cells extend along a lateral direction in cross-section. I.e., each cell of the central group of cells may have a bottom wall and a top wall which are substantially parallel to the lateral direction. Attaching the rocker reinforcement in this specific orientation may increase the energy absorbed during a side crash.

In some examples, the reinforcement may be attached such that the reinforcement is above a battery box of a vehicle when the rocker assembly is mounted to the vehicle. This may divert forces and energy away from the batteries of the vehicle, in particular above the battery box. Damage to the battery box may be reduced. Intrusion into the battery box may also be reduced. In some examples, the reinforcement may be attached to an upper portion of the rocker.

BRIEF DESCRIPTION OF THE DRAWINGS

Non-limiting examples of the present disclosure will be described in the following, with reference to the appended figures, in which.

The figures refer to example implementations and are only be used as an aid for understanding the claimed subject matter, not for limiting it in any sense.

DETAILED DESCRIPTION OF EXAMPLES

Figure 1:
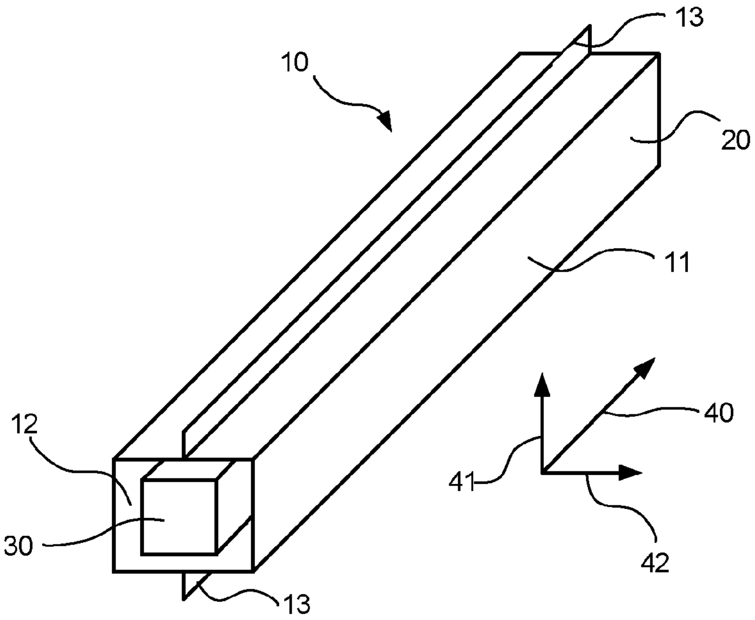
FIG. 1 schematically illustrates a perspective view of a schematic example of a rocker assembly.

FIG. 1 schematically represents a rocker assembly 10 for a vehicle, e.g. a car, to illustrate a longitudinal direction 40, a vertical direction 41 and a lateral direction 42 as used throughout this disclosure. These directions are substantially perpendicular to each other.

The rocker assembly 10 comprises a rocker 20 and an elongated reinforcement 30 inside the rocker. The reinforcement 30 extends along a longitudinal direction 40 of the rocker 20. The rocker 20 comprises an outer panel 11 and an inner panel 12. When mounted to a vehicle, the inner panel 12 of the rocker 20 would be facing an inside of the vehicle whereas the outer panel 11 would be facing an outside of the vehicle.

The rocker 20 and the rocker reinforcement 30 have a length along a longitudinal direction 40 and a cross-section substantially perpendicular to the longitudinal direction 40. A cross-section is defined by a plane including two directions substantially perpendicular to the longitudinal direction 40 and between them, namely a vertical direction 41 and a lateral direction 42.

The longitudinal direction 40 of both the rocker 20 and the rocker reinforcement 30 also corresponds to the longitudinal direction of a vehicle to which the rocker 20 with the rocker reinforcement 30 may be mounted.

In some examples, the length of the rocker reinforcement 30 may be substantially equal to the length of the rocker 20. In some other examples, the length of the rocker reinforcement 30 may be less than the length of the rocker 20, e.g. the reinforcement may have a length of at least 25%, or at least 50%, or at least 75% of a length of the rocker in which it is incorporated. A rocker 20 may include one or more rocker reinforcements 30.

The outer panel 11 and the inner panel 12 of the rocker 20 may be made of an ultra-high strength steel (UHSS), in particular a press hardened ultra-high strength steel, e.g. a boron steel. UHSS exhibits an optimized maximum strength per weight unit and advantageous formability properties. UHSS may exhibit ultimate tensile strength of as high as 1500 MPa, or even 2000 MPa or more, particularly after a press hardening operation. In such an operation, a steel blank is heated to above an austenization temperature, in particular to above Ac3 to substantially fully austenize the blank. After heating to above this temperature for a period of time, the blank is subjected to a pressing operation in which the blank is deformed. At the same time, the blank is rapidly cooled such that the blank is substantially "fully hardened", and a martensitic microstructure is obtained. Examples of hardened steel include UHSS such as 22MnB5 steel or Usibor® 1500, Usibor® being commercially available from Arcelor Mittal.

A lower portion and an upper portion of the outer 11 and inner 12 panels may include mounting flanges 13 for attaching the panels to each other, and also to other parts of the vehicle frame.

The reinforcement 30 may be made of an extruded profile, e.g. of an aluminum alloy, in some examples. Extruded profiles are specifically suitable when a long reinforcement is required. In other examples, a rocker reinforcement may be roll-formed. Suitable aluminum alloys include the aluminum 6000 series or aluminum 7000 series. Suitable aluminum alloys include e.g. 6005, 6060, 6061, 6063, 6082 and 6106.

Using aluminum can reduce the weight of the rocker reinforcement 30, and thus the weight of the rocker assembly 10 and of a vehicle to which the rocker assembly may be mounted. The use of aluminum also facilitates the obtention of a rocker reinforcement 30 with a cross-section like the cross-section shown in FIGS. 2-5 by extrusion. Adapting the thickness(es) and shape(s) in cross-section of a rocker reinforcement 30 may also be easier with the use of aluminum and extrusion. A length of an extruded rocker reinforcement 30 may likewise be easily tailored. In some examples, a length of a rocker reinforcement 30 may be between 1 and 1.5 m. The length of the rocker reinforcement may vary in particular as a function of the length of the rocker, but the geometry and space available inside the rocker may also play a role.

A combination of lightweight aluminum for absorbing energy and UHSS for strength can lead to a good combination of energy absorption and impact resistance.

Figure 2:
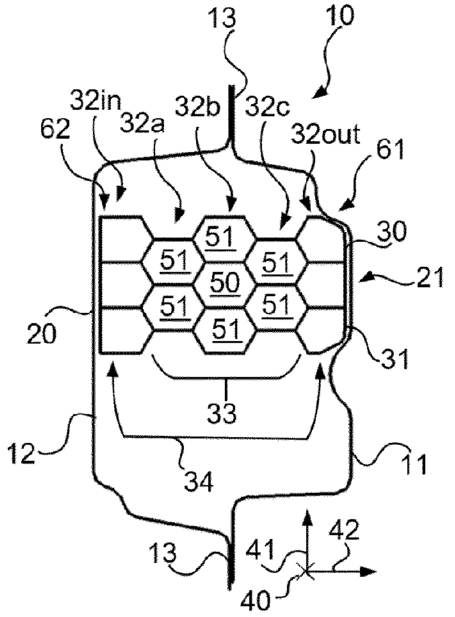
FIGS. 2-5 schematically illustrates different examples of a rocker assembly in cross-section.

FIG. 2 schematically illustrates an example of a rocker assembly 10 in cross-section.

The rocker reinforcement 30 is made of a lattice of cells 31. The lattice of cells 31 includes a central group of cells 33 which are substantially hexagonal in cross-section.

The central group of cells 33 comprises a central cell 50 surrounded by six adjacent cells 51. Each of the surrounding adjacent cells 51 shares one of the six walls of the central cell 50. Having a central group of cells 33 with a central cell 50 surrounded by six adjacent cells 51, i.e. a central group of cells 33 comprising one tile, may increase the amount of energy absorbed in a side impact with respect to other configurations of rocker reinforcements.

In some examples, one or more of the cells of the central group of cells 33, including all the cells, may form, in cross-section, regular hexagons. For example, in FIG. 2 all the cells of the central group of cells 33 have, in cross-section, walls with a substantially same length and central angles of about 120°. In other examples, one or more of the cells of the central group of cells 33 may form, in cross-section, irregular hexagons. Having a central group of cells 33 with all of its cells forming regular hexagons in cross-section may increase the energy absorbed by the rocker reinforcement 30 in comparison to when the cross-section of the cells is irregular.

Figure 3:
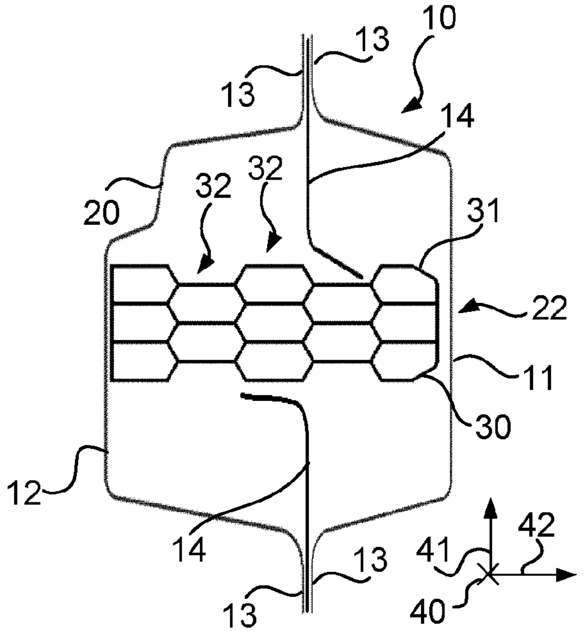

FIG. 3 shows a rocker assembly 10 in cross-section where rocker 20 differs in shape from that of FIG. 2. The location of the reinforcement within the rocker 30 is also different in these figures: in FIG. 2 the reinforcement 30 is arranged in an upper portion 21 of the rocker 20 whereas in FIG. 3 the reinforcement is arranged in a central portion 22 of the rocker 20. In other examples, a rocker reinforcement 30 may be arranged in a lower portion of a rocker 20. The reinforcement 30 of FIG. 3 is like the reinforcement 30 of FIG. 2, but the top and bottom walls of the cells of the central group 33, i.e. the cell walls substantially parallel to the lateral direction 42 in FIG. 3, are longer than the side walls of the cells. These cells therefore have a hexagonal cross-section in which the hexagons are irregular.

In some examples, the cells of the central group of cells 33 may be oriented such that two opposite walls of each cell, in cross-section, are substantially parallel to the lateral direction 42. I.e., a top wall and a bottom wall of each cell of the central group of cells 33 extend along the lateral direction 42 in cross-section. This may be seen in the examples of FIGS. 2-5. For example, in FIG. 2 the cells of the central group of cells 33 have their top and bottom walls extending along the lateral direction 42. One diagonal of each cell, in cross-section, is therefore substantially parallel to the lateral direction 42. This specific orientation of the hexagonal cells may be particularly suitable for absorbing energy in side impacts where a force, or at least a component of a force, is exerted along a lateral direction 42. This orientation may also increase the absorption of energy in a lateral crash e.g. with respect to where two opposite walls of each cell of the central group of cells 33, in cross-section, are aligned along a vertical direction 41 or along another direction different from the lateral direction 42.

Although not illustrated in the figures, a rocker reinforcement 30 may comprise a central group of cells 33 such that, in cross-section, two opposite walls of each cell of the central group of cells 33 are substantially aligned along a vertical direction 41. In these examples, the two opposite walls extending along a vertical direction 41 in cross-section may be referred to as vertical lateral walls. Still in other examples, two opposite walls of each cell of the central group of cells 33 may be substantially parallel, in cross-section, to a direction different from the lateral direction 42 and the vertical direction 41. In these examples, none of the walls of a cell of the central group of cells 33 would be substantially parallel to a lateral direction 42 and to a vertical direction 41. Regardless the alignment of the cell walls in cross-section, in any of the examples above, as well as in the examples shown in the figures, a central group of cells 33 comprises a central cell 50 surrounded by six adjacent cells 51.

Where two opposite walls of each cell of the central group 33 are substantially parallel to the lateral direction 42, the cells may be organized in columns 32. A central group 33 may therefore comprise a first column 32*a*, a second column 32*b* contiguous to the first column 32*a*, and a third column 32*c* contiguous to the second column 32*b*. The columns are contiguous along a lateral direction 42. The first column 32*a* comprises at least two cells, the second column 32*b* comprises at least three cells, and the third column 32*c* comprises at least two cells. The first 32*a*, second 32*b* and third 32*c* columns are different columns. The first, second and third columns are contiguous along the lateral direction.

In some examples, the first column 32*a* of the central group of cells 33 may consist of two cells, the second column 32*b* of the central group of cells 33 may consist of three cells, and the third column 32*c* of the central group of cells 33 may consist of three cells. This particular configuration may maximize the energy absorbed by the rocker reinforcement 30 while keeping a low weight of the reinforcement 30.

Figure 4:
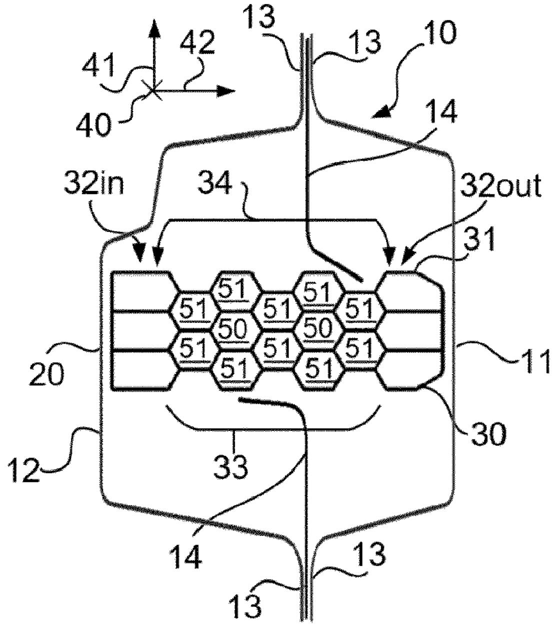

FIG. 4 shows another example of rocker assembly 10 in cross-section. In FIG. 4, the central group of cells 33 of the reinforcement 30 comprises a plurality of regular hexagons in cross-section, as the reinforcement 30 of FIG. 2. But the central group of cells 33 includes two central cells 50 in this example of FIG. 4. Similarly, as the central group of cells is organized in columns, the central group of cells comprises five columns. In FIGS. 2 and 3, the number of cells in each adjacent column follows the pattern 2:3:2. In FIG. 4, the number of cells in each adjacent column follows the pattern 2:3:2:3:2. Two tiles sharing a column of two cells may therefore be seen. More generally, in some examples the number of cells in each adjacent column follows the pattern $2{:}(3{:}2)_C$, wherein C is an integer number which indicates how many groups of adjacent columns having three and two cells are present in the central group of cells 33. Another way to see it is that there may be a number T of tiles which share T−1 columns. Even more generally, the pattern can be written as $N{:}(N+1{:}N)_C$, with N>1 indicating the number of cells per column. This pattern is just illustrative, and deviations from this pattern are of course possible.

Figure 5:
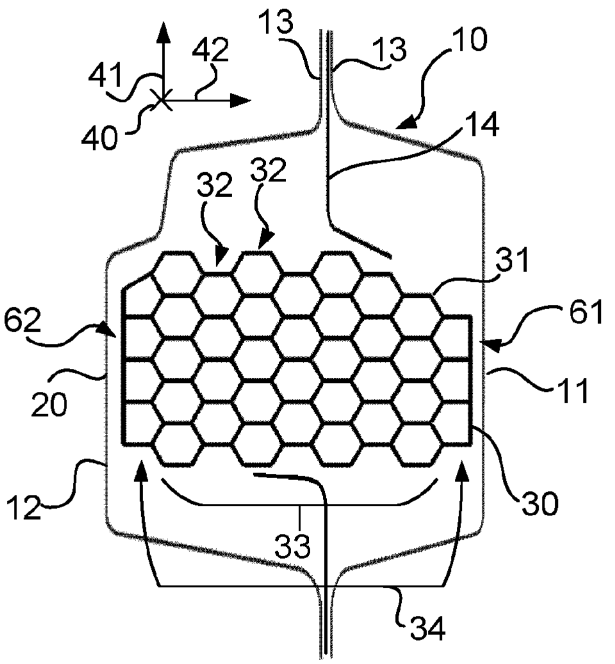

FIG. 5 shows an example of a rocker assembly 10 in which the rocker reinforcement 30 is made of a lattice of cells 31 comprising a central group of cells 33 with seven columns 32. In this example, the number of cells in each column of the central group of cells is 5:4:5:4:5:4:4. The number of cells in each column may therefore be adapted to a desired height of the rocker reinforcement 30 and to a shape of the outer and/or inner rocker panels. A height may be measured along a vertical direction 41.

The lattice of cells 31 may further include a lateral group of cells 34. The lateral group of cells 34 comprises an inner lateral group 62 comprising one or more inner cells configured to receive an impact of the inner panel 12 of the rocker 20. The lateral group of cells 34 further comprises an outer lateral group 61 comprising one or more outer cells configured to receive an impact of the outer panel 11 of the rocker 20. The impact may be a direct impact, i.e. the outer panel 11 may directly contact one or more outer cells. A portion of the cells configured to face the outer 11 and inner 12 rocker panels follows a shape of the outer and inner rocker panels. I.e., the cell walls of the one or more outer cells 61 configured to receive an impact from the outer rocker panel 11, or in other words, the perimetral walls 73 of these cells (see FIG. 6) follow a shape of the outer rocker panel 11. This likewise applies to the one or more inner cells 62 and the inner panel 12. In other examples, the cell walls of the one or more outer cells and/or the cell walls of the one or more inner cells do not need to follow a shape of the corresponding outer or inner panel, respectively.

If the cells are arranged in columns, the outer cells of the outer group of cells 61 may form an outer column 32out and the inner cells of the inner group of cells 62 may form an inner column 32in. The outer column 32out may be configured to receive an impact of the outer panel 11 of the rocker 20 and the inner column 32in may be configured to transmit the impact to the inner panel 12 of the rocker 20. Each of the outer column 32out and the inner column 32in comprises at least two cells. A portion of the cells of the outer 32out and inner 32in columns configured to face the outer 11 and inner 12 panels of the rocker 20 follows a shape of the outer 11 and inner 12 panels of the rocker 20.

For example, in FIG. 2 the walls of the cells of the inner column 32in configured to face the inner rocker panel 12 are substantially straight in order to adapt to the corresponding substantially straight portion of the inner rocker panel 12. Similarly, the walls of the upper and lower cells of the outer column 32out configured to face the outer rocker panel 11 are substantially curved in order to adapt to the corresponding substantially curved portion of the outer rocker panel 11. The central cell of the outer column 32out has a straight wall for following the shape of the corresponding portion of outer rocker panel 11. The same concept applies to the reinforcements 30 of FIGS. 3-5.

With respect to the number of cells in each column 32 of the lattice 31, in some examples a pattern $(M+1{:}M)_C{:}M+1$ may be followed. In FIGS. 2 and 3, M is 2 and C is 2. In FIG. 4, M is 2 and C is 3. Again, deviations from this pattern are possible.

In some examples, all the walls of the lattice of cells 31 may have a substantially same thickness. A thickness of the walls of the cells may be e.g. between 1 mm and 6 mm. For example, a thickness of the walls may be about 2 mm in some examples. In other examples, a thickness of the walls may be about 3.5 mm. The thickness of the walls of the cells of the reinforcement may be varied in order to optimize the amount of energy absorbed by the rocker assembly 10 in a side crash.

Figure 6:
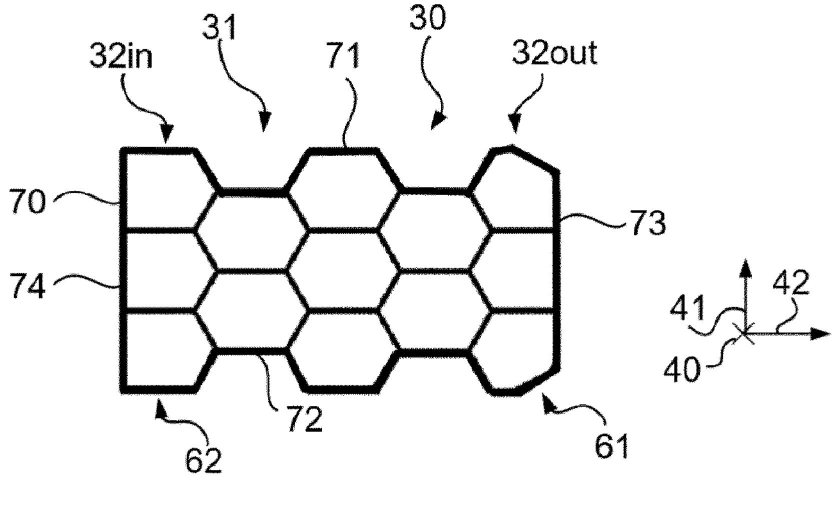
FIG. 6 schematically illustrates another example of the reinforcement shown in FIG. 2.

In some other examples, the walls of the lattice of cells 31 may have different thicknesses. In some examples, the cell walls forming a perimeter 70 of the lattice of cells 31 may have a different thickness than the cell walls enclosed inside the perimeter of the lattice of cells 31. A perimeter 70 of the reinforcement in cross-section may be seen in FIG. 6, which shows a reinforcement 30 with the same cross-section of the reinforcement 30 of FIG. 2. The perimeter 70 of the reinforcement 30 of FIG. 6 is thicker than the walls of the cells enclosed by the perimetral walls.

A perimeter 70 of the lattice of cells may comprise four portions: an upper portion 71, a lower portion 72, an outer portion 73 and an inner portion 74. The inner portion 74 of the perimeter includes cell walls of the inner cells of the inner group of cells 62, e.g. cell walls of the inner column 32in, and the outer portion 73 of the perimeter includes cell walls of the outer cells of the outer group of cells 61, e.g. cells of the outer column 32out. The upper portion 71 of the perimeter joins the top of the inner 74 and outer 73 portions of the perimeter, and the lower portion 72 of the perimeter joins the bottom of the inner 74 and outer 73 portions of the perimeter.

In some examples, a thickness of an outer portion 73 of the perimeter of the lattice cells, e.g. substantially vertical walls of an outer column 32out belonging to the lattice perimeter 70, may be less than a thickness of an inner portion 74 of the perimeter of the lattice cells, e.g. substantially vertical walls of an inner column 32in belonging to the lattice perimeter 70.

In some examples, a thickness of the perimetral cell walls of the outer cells 61 may be between 1 and 2 mm, e.g. about 1.5 mm, whereas a thickness of the perimetral cell walls of the inner cells 62 may be between 4 and 6 mm, e.g. about 5 mm.

If a portion of the cell walls which may be hit first in a lateral crash has a lower thickness than a portion of the cell walls which may feel the impact the latest, an inner portion of the reinforcement 30, and thus of the rocker 20, may not deform excessively.

In some examples, perimetral top 71 and/or bottom 72 walls of the lattice of cells 31, i.e. the cell walls forming the perimeter of the lattice 31 which substantially extend along a lateral direction 42, may have a thickness substantially equal to the perimetral outer cell walls, i.e. the cell walls belonging to the outer perimeter 73 of the lattice of cells 31.

A rocker reinforcement 30 made of extruded aluminum with dimensions in cross section as indicated herein may provide an appropriate strength to the rocker reinforcement, e.g. a strength similar to that of a rocker reinforcement made of steel, while maximizing energy absorption.

A width of the rocker reinforcement 30 may be similar to, but less than, a width of the rocker 20. A width may be measured along a lateral direction 42. In this way, a space between an inner portion 74 of a perimeter 70, in cross-section, of the reinforcement 30, and an inner surface of the inner 12 rocker panel may be minimized. Likewise, a space between an outer portion 73 of a perimeter 70, in cross-section, of the reinforcement 30, and an inner surface of the outer 11 rocker panel may be minimized. In some examples, the reinforcement 30 may touch a surface of the inner and/or outer panels of the rocker at least at some regions along the longitudinal direction 40.

The rocker 20 and the rocker reinforcement 30 may be attached to one another through one of more fasteners 14. In FIGS. 3-5, the fastening means 14 comprise two strips, e.g. steel strips. The steel strips may be made of a high-strength steel, specifically of a high-strength low-alloy steel. In an example, HSLA420 as commercialized by ArcelorMittal may be used. Similar steels may include Docol® 420LA. "420" as used in these examples indicates a minimum yield strength for the steels. Alternative steels may also be used.

An end of the strip may be joined to a mounting flange 13 of the outer 11 and/or inner 12 rocker panels. Another end may be joined to the reinforcement 30, e.g. to a bottom or a top of the reinforcement. The examples of FIGS. 3-5 show what a first strip is joined to a top of the reinforcement whereas a second strip is joined to a bottom of the reinforcement. Attachment may be through a screw or a rivet. This kind of fastener may be particularly suitable for joining a central portion of the rocker reinforcement 30 to the rocker 20, but it may also be used to attach one or both longitudinal ends of the reinforcement 30 to the rocker 20.

Other possible way of attaching the reinforcement 30 and the rocker 20, in particular a longitudinal end of the reinforcement 30, may be by joining an end of a strip, e.g. a steel strip, to an inner portion of the inner 12 or outer 11 rocker panel, and the other end of the strip to the longitudinal end of the reinforcement. The strip may therefore extend along a longitudinal direction 40.

Fasteners 14 may include any suitable connecting element. Fasteners 14 may include at least one or more of strips, brackets, rivets, screws, bolts, adhesive and resin. The use of adhesives and resins may reduce vibrations.

The rocker assembly 10 may be configured such that the reinforcement 30 is arranged above a battery box of a vehicle when mounted to the vehicle. In some examples, the reinforcement 30 is arranged in a central 22 or upper portion 21 of the rocker 30. In some of these examples, a vertical gap between a lower portion of the perimeter 72 of the lattice of cells 31 and the bottom of the rocker may be substantially equal to or greater than a vertical gap between an upper portion of the perimeter 71 of the lattice of cells 31 and the top of the rocker.

This particular positioning of the rocker reinforcement 30 may avoid, or at least reduce, the contact between the rocker and the battery box when the vehicle is involved in a crash. Locating the reinforcement 30 above the battery box may guide a side force compressing the rocker above the battery box, thus possibly decreasing damage to the battery box.

Figure 8:
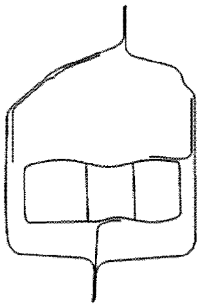
FIGS. 8-10 schematically illustrate cross-sections of three examples of rocker assemblies of the prior art.
Figure 9:
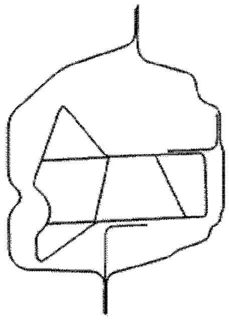
Figure 10:
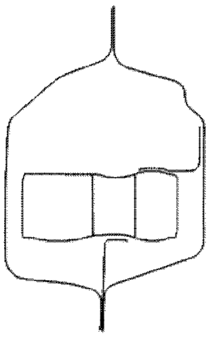

The behavior of rocker assemblies according to the invention, e.g. the rocker assembly 10 of FIG. 2, has been compared to the behavior of several rocker assemblies of the prior art in a Euro NCAP's test in a simplified subsystem. In the compared situations, all the reinforcements were made of extruded aluminum. Three examples of the prior art are shown in FIGS. 8, 9 and 10. The rocker assemblies are for Volvo vehicles, in particular for models XC60 (FIG. 8), XC90 (FIG. 9) and S90 (FIG. 10). The energy absorbed per section mass of the rocker assembly (abbreviated herein as AE/SM) for these examples of rocker assemblies of the prior art and for the rocker assembly of FIG. 2 are shown in the following table. The section mass (SM) indicates the weight of the rocker assembly 10 per length of a section (longitudinal portion) of the rocker assembly. It is usually expressed in kilograms per meter of section. This length is measured along a longitudinal direction 40. The energy absorbed by the aluminum reinforcement per section mass of the aluminum reinforcement, abbreviated herein as AE(Al)/SM(Al), is also indicated in the table. The data for the example of rocker assembly 10 of FIG. 2 is indicated for a reinforcement 30 having a thickness of about 2.0 mm.

TABLE 1

| | XC60 | XC90 | S90 | Example of FIG. 2 |
|---|---|---|---|---|
| AE/SM (kJ · m/kg) | 0.78 | 0.75 | 0.83 | 1.53 |
| AE(Al)/SM(Al) (kJ · m/kg) | 1.30 | 1.38 | 1.51 | 2.54 |

As it may be seen in table 1, rocker reinforcements and rocker assemblies according to the invention may lead to an increased energy absorption with respect to rocker assemblies and rocker reinforcements of the prior art.

Figure 7:
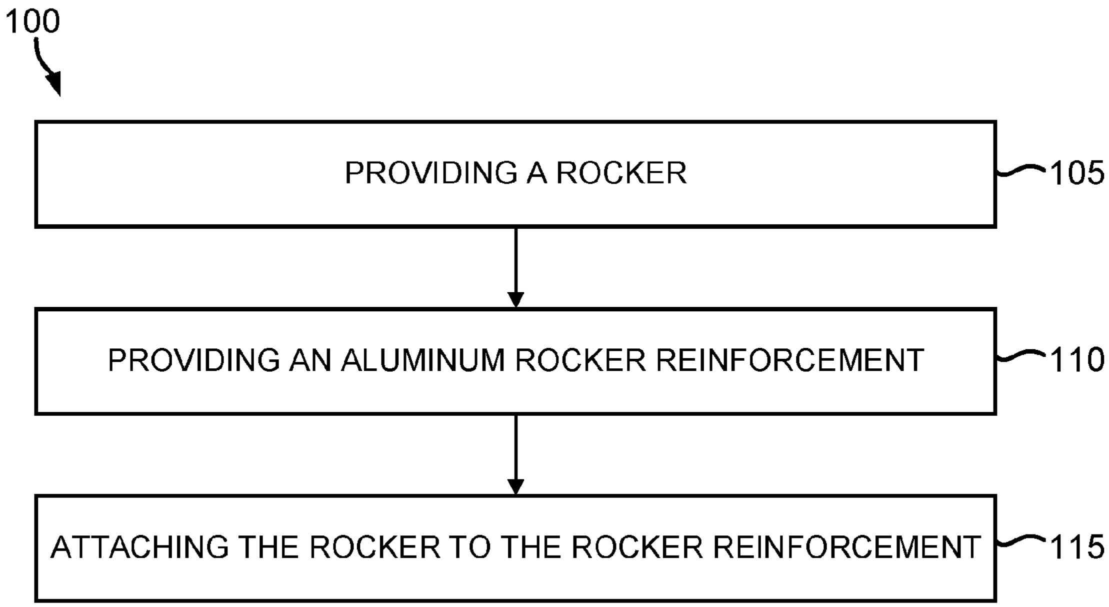
FIG. 7 illustrates a flow chart of an example of a method for manufacturing a rocker assembly.

FIG. 7 illustrates a flowchart of a method 100 for manufacturing a rocker assembly 10 for a vehicle comprising a rocker 20 and a rocker reinforcement 30 attached to the rocker 20. The rocker 20 and the rocker reinforcement 300 may be any of the rockers 20 and rocker reinforcements 30 described throughout this disclosure.

The method 100 comprises, at block 105, providing a rocker 20. A rocker comprises an outer panel 11 and an inner panel 12. The rocker 20 may be bade of hardened steel, e.g. of an UHSS.

Method 100 further comprises, at block 110, providing an aluminum rocker reinforcement 30 with a cross-section as disclosed herein, e.g. as illustrated in any of FIGS. 2-6. Extrusion may be used in some examples.

In order to obtain an aluminum rocker reinforcement 30 with such a cross-section by extrusion, a die with a cross-sectional profile as disclosed herein may be obtained first. A die may be made of steel. The die may be preheated to a temperature between 400-600° C. to facilitate an even flow of aluminum through the die. Once the die is loaded in an extrusion press, an aluminum billet, which may be preheated in order to make it malleable e.g. to a temperature between 400-600° C., may be pushed against and through the die by a ram. An aluminum extrusion may come out with a desired cross-section. Cooling, aligning and/or cutting of the aluminum extrusion may be additionally performed in order to obtain a rocker reinforcement 30.

Method 100 further includes, at block 115, mechanically attaching the rocker reinforcement 30 to the rocker 20 such that the cells of the central group of cells 33 are substantially hexagonal when taking a cross-section of the rocker assembly 10.

In some examples, the reinforcement 30 may be attached such that two opposite cell walls of each cell of the central group of cells 30 extend along a lateral direction 42. This specific orientation may increase the energy absorbed during a crash.

In some examples, the reinforcement 30 may be attached such that the reinforcement 30 is above a battery box of a vehicle when the rocker assembly is mounted to the vehicle. This may divert forces and energy away from the batteries of the vehicle, in particular above the battery box. Damage to the battery box may be reduced. Intrusion into the battery box may also be reduced. In some examples, the reinforcement 30 is attached to an upper portion 21 of the rocker 20.

As explained above, the rocker reinforcement 30 may be attached to an outer rocker panel 11 and/or to an inner rocker panel 12. Fasteners 14 such a steel strips may be used to this end. The outer and the inner rocker panels may be joined to one another.

"Soft zones", i.e. areas of lower mechanical strength (areas with lower ultimate tensile strength and yield strength, but potentially with more ductility), may be provided at certain areas of the rocker 20 envisaged as attachment points. For example, soft zones may be provided at the areas of the rocker panels where screws, rivets or similar fasteners may be attached. This may facilitate the attachment between the rocker 20 and the rocker reinforcement 30, e.g, wherein the rocker 20 is made of UHSS and the reinforcement 30 is made of aluminum. Providing soft zones at the attachment points of the rocker may also help to avoid, or at least reduce, concentration of stresses at these points, and possible early rupture or cracking in case of an impact.

Soft zones may additionally or alternatively be provided in one or both rocker panels 11, 12 to improve ductility and energy absorption of the rocker in the regions where these soft zones are created.

The soft zones may for example be created by a partial heat treatment after hot forming die quenching. A laser or an induction heater may be used to locally create areas of different microstructure on the rocker panels.

In some examples, the mounting flanges 13 of the rocker 20 may be formed as soft zones in a press hardened ultra-high strength steel. If the flanges 13 are made as zones that are softer than the remaining of the rocker 20, the flanges 13 may be joined to each other, as well as to the fasteners 14, easier. Stress concentrations at the points of attachment may be avoided, or at least reduced.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A rocker assembly for a vehicle comprising:
- a rocker including an outer panel and an inner panel, and
- an elongated reinforcement inside the rocker extending along a longitudinal direction of the rocker, wherein
- a vertical direction and a lateral direction define a cross-section of the rocker assembly that is substantially perpendicular to the longitudinal direction,
- wherein the reinforcement is made of an aluminum alloy extruded profile constituting a lattice of cells and comprises a central group of cells which are substantially hexagonal in cross-section, a cell being formed by a plurality of walls forming a closed cross-section,
- the central group of cells comprising a central cell surrounded by six adjacent cells;
- wherein the lattice of cells further comprises a lateral group of cells comprising:
- an outer lateral group of cells comprising one or more outer cells configured to directly receive an impact of the outer panel of the rocker; and
- an inner lateral group of cells comprising one or more inner cells configured to transmit the impact directly to the inner panel of the rocker.

2. The rocker assembly of claim 1, wherein the cells of the central group of cells in cross-section form regular hexagons.

3. The rocker assembly of claim 1, wherein the inner lateral group of cells is directly adjacent to the central group of cells, and wherein the cells of the inner lateral group configured to face the inner rocker panel is complementary to a shape of the inner rocker panel.

4. The rocker assembly of claim 1, wherein a thickness of the walls of the cells of the lattice of cells is between 1.5 mm and 5.5 mm.

5. The rocker assembly of claim 1, wherein the reinforcement is arranged such that in use the reinforcement is vertically above a battery box of a vehicle when the rocker assembly is mounted to the vehicle.

6. The rocker assembly of claim 1, wherein two opposite walls of each cell of the central group of cells are substantially parallel to the lateral direction.

7. The rocker assembly of claim 1, wherein the central group of cells consist of:
- a first column having at least two cells,
- a second column contiguous to the first column along the lateral direction and having at least three cells, and
- a third column contiguous to the second column along the lateral direction and having at least two cells.

8. The rocker assembly of claim 7, wherein the outer cells of the outer lateral group of cells are directly adjacent to the central group of cells and form a single outer column and the inner cells of the inner lateral group of cells are directly adjacent to the central group of cells and form a single inner column.

9. The rocker assembly of claim 1, wherein the inner and outer panels of the rocker are made of an ultra-high strength steel.

10. The rocker assembly of claim 1, wherein the inner lateral group, the outer lateral group, and the central group of cells have a same height.

11. A method for manufacturing a rocker assembly for a vehicle, the method comprising:
- providing a rocker including an inner panel and an outer panel;
- providing an aluminum rocker reinforcement; and
- mechanically attaching the rocker reinforcement to the rocker, wherein
- the aluminum rocker reinforcement is made of a lattice of cells, a cell being formed by a plurality of walls forming a closed cross-section and the reinforcement comprises
- a central group of cells;
- an outer lateral group of cells adjacent to the central group of cells; and
- an inner lateral group of cells adjacent to the central group of cells,
- wherein the cells of the central group of cells are hexagonal in cross-section, and the central group of cells consists of a central cell surrounded by six adjacent cells,
- wherein the outer lateral group of cells comprises one or more outer cells configured to directly receive an impact of the outer panel of the rocker, and
- wherein the inner lateral group of cells comprises one or more inner cells configured to transmit the impact directly to the inner panel of the rocker, wherein
- the inner lateral group, the outer lateral group, and the central group of cells have a same height.

12. The method of claim 11, wherein mechanically attaching the aluminum rocker reinforcement to the rocker further comprises arranging the aluminum rocker reinforcement such that two opposite cell walls of each cell of the central group of cells extend along a lateral direction.

13. The method of claim 11, wherein mechanically attaching the aluminum rocker reinforcement to the rocker further comprises arranging the aluminum rocker reinforcement such that the aluminum rocker reinforcement is positioned vertically higher than a battery box of a vehicle when the rocker assembly is mounted to the vehicle.

14. The method of claim 11, comprising using two or more steel strips for attaching the aluminum rocker reinforcement to the rocker.

15. The method of claim 11, further comprising creating one or more zones of lower mechanical strength in the rocker.

16. A vehicle comprising:

a battery box; and a rocker assembly, wherein the rocker assembly comprises a rocker including an inner panel and an outer panel, and an elongated rocker reinforcement inside the rocker and extending along a longitudinal direction, wherein a vertical direction and a lateral direction define a cross-section of the rocker assembly that is substantially perpendicular to the longitudinal direction, the rocker reinforcement is made of a lattice of cells, a cell being formed by a plurality of walls forming a closed cross-section and the reinforcement comprises a central group of cells;

an outer lateral group of cells; and an inner lateral group of cells, wherein the cells of the central group of cells are hexagonal in cross-section, and the central groups of cells consists of a central cell surrounded by six adjacent cells, wherein the outer lateral group of cells is adjacent to the central group of cells and consists of a single column of one or more outer cells configured to directly receive an impact of the outer panel of the rocker, and wherein the inner lateral group of cells is adjacent to the central group of cells and consists of a single column of one or more inner cells configured to transmit the impact directly to the inner panel of the rocker, and wherein the rocker assembly is arranged laterally to the battery box, and wherein the rocker reinforcement is positioned vertically higher than the battery box.

17. The vehicle of claim 16, wherein the rocker reinforcement is an aluminum extruded profile.

18. The vehicle of claim 17, wherein the inner and outer panel of the rocker are made of hot stamped ultra high strength steel.

19. The vehicle of claim 18, wherein the cells of the central group of cells are regular hexagons in cross-section.

* * * * *